Jan. 18, 1944.  L. J. STEPHENSON  2,339,436
HOT BEARING ALARM SYSTEM
Filed May 17, 1941
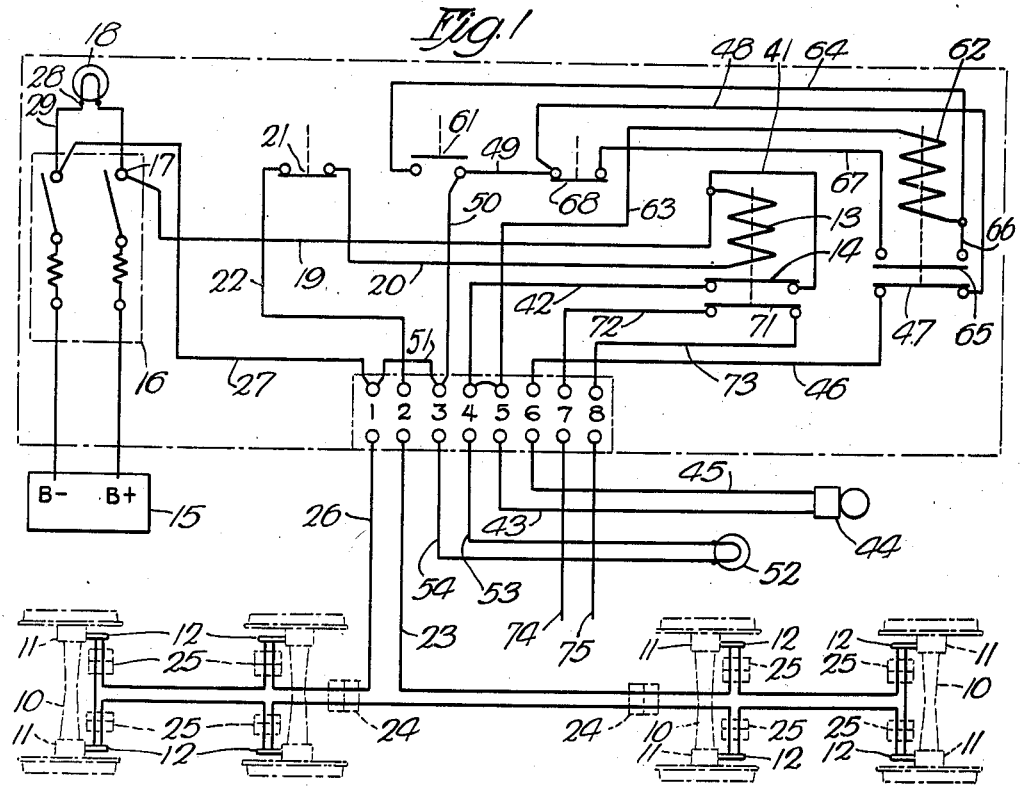
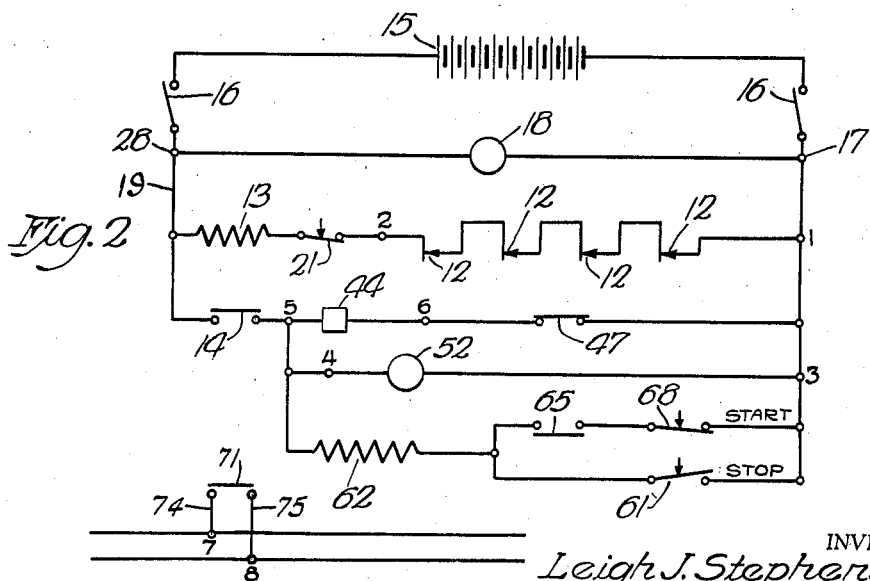
INVENTOR.
Leigh J. Stephenson
BY
Oscar Hochberg, ATTY.

Patented Jan. 18, 1944

2,339,436

UNITED STATES PATENT OFFICE 2,339,436

HOT BEARING ALARM SYSTEM

Leigh J. Stephenson, Markham, Ill., assignor to Pullman-Standard Car Manufacturing Company, Chicago, Ill., a corporation of Delaware Application May 17, 1941, Serial No. 393,993

1 Claim. (Cl. 177—311)

The invention relates to a hot bearing alarm system for railway cars which will warn the train crew in charge of the car of any temperature of any journal bearing on the car in excess of a predetermined maximum safe temperature.

The invention is particularly intended for use on railway passenger cars and one of the objects of the arrangement is to provide an audible alarm for signaling an overheated journal condition but which may be shut off by some member of the train crew accepting responsibility for the situation.

Another object of the invention is the provision of a hot bearing alarm system having an audible signal which may be shut off by any member of the train crew assuming responsibility for the correction of the condition, wherein means are provided automatically to restore or reset the alarm system when the journal causing an alarm has cooled down to a normal condition.

A further object of the invention is the provision of a hot bearing alarm system, wherein positive protection is afforded in event of failure in associated wiring on the car or in the device, whereby an alarm will be caused to be sounded rather than be prevented.

It is a still further object of the invention to provide a hot bearing alarm system having means for testing the entire system to cause it to operate in the same manner as in an emergency and with the further safeguard that it cannot be left in an inoperative condition through accidental or inadvertent failure to restore the alarm circuit to operative condition.

The foregoing and other objects of the invention are attained by the mechanism illustrated in the accompanying drawing, wherein—

Fig. 1 is a diagrammatic view of the invention as applied to a railway car showing the panel wiring diagram and the circuit connections to the journal boxes; and Fig. 2 is a schematic illustration of the electrical circuit for the illustrated embodiment of the invention.

With the high speeds at which modern passenger trains travel it is highly desirable that the individual cars of the trains be equipped with devices for measuring the temperature of each of the journal bearings thereon, and warning the crew in charge of the train when the temperature of any one or more bearings on any particular car exceeds a predetermined maximum safe temperature by registering an alarm in the individual cars and at the head end of the train. Preferably, the alarm should be audible as well as visual. However, an audible alarm, sufficient to attract the attention of the train crew, would create an annoyance in passenger cars and become somewhat of a nuisance and especially so in sleeping cars. This renders necessary the provision of some means for silencing the alarm, once the warning has been acknowledged and the responsibility for correction of the condition has been accepted by a member of the train crew. A procedure of this kind, however, might prove hazardous unless some means is also provided automatically to reset or restore the alarm system to normal condition when the overheated bearing has cooled to normal temperature. The present invention is designed to provide protection of this type together with other desirable features more fully hereinafter disclosed.

Referring now to Fig. 1 of the drawing, it will be seen that a car set of wheeled axles 10 having inboard journal boxes 11 has been illustrated as disposed in groups of two—representative of the customary four wheel trucks at each end of a railway car. A thermostat 12, the contacts of which are normally closed, is recessed into each journal box and all of them connected in series, one with respect to the other, and with the operating coil 13 of a relay 14 and the entire circuit connected across the battery 15. So long as all of the journal bearings do not exceed their normal operating temperature, the contacts of thermostats 12 will remain closed and relay coil 13 energized, under which conditions the battery current flows through the circuit as follows:

From the positive side of the battery the current passes through a circuit breaker 16, to one side 17 of a circuit to the pilot light 18, which gives a visual indication as to when the system is energized and working, and thence through wire 19 to the relay coil 13 and from that device through wire 20 to a spring return push button test switch 21 and then through wire 22 to terminal point 2 whence it travels through the thermostat circuit 23, passing through flexible couplings 24, where the circuit would jump from a car body to the respective trucks and through flexible couplings 25 at the individual journal boxes as the current flows in series to the respective thermostats and then back through wire 26 to terminal point 1, from where it passes through wire 27 to the circuit breaker 16 to complete the circuit to the negative side of the battery 15. The circuit to the other side of the pilot light 18 is completed by means of wire 29 leading from the negative side of the battery and the circuit breaker to the contact 28 on the pilot light. The circuit breaker 16, as shown, protects both sides of the battery circuit.

In the event that the temperature of any one or more journal bearings reaches the predetermined unsafe degree for which the thermostats are calibrated, the contacts of the thermostat affected will open, thus creating a break in the circuit and, thereby, deenergize the relay coil 13 to cause the relay contact 14 to drop and close the contacts between wire 41 and wire 42. This provides a circuit from the positive side of the battery through wires 19 and 41 over the contact 14 and wire 42 to terminal point 4 from where the current passes to terminal point 5 and through wire 43 to the buzzer 44 and then through wire 45 back to terminal point 6 from which point it travels through wire 46 over normally closed contact 47 and then through wires 48, 49, and 50 to terminal point 3 then to terminal point 1 through wire 51 and wire 27 and the circuit breaker 16 to the negative side of the battery, thus completing the circuit. This causes the buzzer 44, which may be placed at the desired location in the car, to sound an alarm and at the same time a circuit in parallel with the buzzer is provided to a signal light 52 which is located in the car at a position where it can be seen by the trainmen. Wires 53 and 54 from the positive and negative sides of the circuit, respectively, are tapped off of terminal points 4 and 3 at the positive and negative sides of the buzzer circuit wires 42 and 50 and provide the parallel circuit to the light 52, so that when an alarm is sounded by the buzzer 44 the light is also lighted and remains alight until such time as the overheated bearing has cooled to normal temperature.

The buzzer 44 may be silenced by some member of the train crew acknowledging the warning and who accepts the responsibility for correction of the condition. This is accomplished by means of a spring return push button 61 which provides a circuit in parallel with the signal light consisting of the relay coil 62 and the normally open contacts across the push button 61. When it is desired to silence the buzzer 44, the push button 61 is depressed momentarily to energize the coil 62 from the positive side of the battery through wires 19, 41, 42, through the jumper to terminal point 5, and through wire 63 to the coil from where the current courses through wire 64 and contact 61, and thence through wires 50, 51, and 27, to the negative side of the battery to complete the circuit. Energization of the coil 62 lifts contact 47, thereby to provide a break in the buzzer circuit between wires 46 and 48, and thus stop the buzzer from operating. A holding circuit is provided to keep coil 62 energized to retain the contact 47 in open position and thereby maintain the silenced condition of the buzzer 44. A second contact 65, operable with contact 47 by the energization of relay coil 62, closes the gap between the normally open contacts on wires 66 and 67 to provide a circuit which will afford a course in parallel to that from the coil 62, through wire 64, push button 61, and wires 50, 51, 27, to the negative side of the battery, by means of wire 66, contactor 65, wire 67, normally closed push button 68, and thence through wires 49, 50, 51, 27, to negative battery, thereby to maintain the energization of relay coil 62 after the normally open push button 61 is released and thus hold the contact 47 open to prevent operation of the buzzer. When the buzzer 44 is silenced in the manner described, the signal light 52 will remain lighted, since the circuit thereto is in parallel with the buzzer circuit and remains unbroken, and provides a continuous indication to the train crew as long as any bearing is overheated. The holding circuit for the relay 62 may be broken by momentarily depressing the normally closed push button 68, which is disposed across the contacts between wires 67 and 49, and, therefore, depression of this button causes a gap in the negative side of the circuit through the relay coil 62, deenergizing that element and causing the contact 65 to drop out and which cannot reclose unless the push button 61 is pressed again to energize the relay coil. When the contact 65 drops out, contact 47 closes the gap between wires 46 and 48 on the negative side of the buzzer circuit, thereby to restart the buzzer.

When the overheated bearing has cooled to normal temperature its thermostat 12 will reclose its contacts, whereby to reenergize the relay coil 13 and cause the contact 14 to open, thus restoring the whole system to normal condition, whereupon the signal light 52 will go out and if the buzzer 44 is energized it will stop. If the buzzer has been silenced by means of the push button 61, then relay coil 62 will automatically be deenergized by the opening of contact 14. The system is thus reset for normal operation and full protection restored, without the possibility through failure of the human element to leave the system in an inoperative condition.

The push button test switch 21 is disposed in the series circuit with the thermostats 12 and is normally closed so that when this element is operated the entire system is tested in the same manner as by an overheated bearing, since it provides a gap in the circuit between the wires 20 and 22 which functions to cause the system to operate in exactly the same way as by an overheated bearing. Since the push button 21 is normally closed in the circuit, it will be seen that the system cannot accidentally be left in an inoperative condition since the warning devices will operate so long as a break is maintained in the series circuit. Similarly, any failure in the wiring of the system will cause an alarm to be given rather than prevent one.

The system is so designed as to provide a warning signal to the operators at the head end of the train in addition to that given in the individual cars of the train, and to this end an additional circuit extends throughout the length of the train and which is disposed to give an indication at the head end in the event of an overheated bearing on any one of the cars of the train. When the contact 14 drops out as a result of the deenergization of relay coil 13 by the occurrence of an overheated journal bearing and completes the circuit to the buzzer 44 and signal light 52, a second contact 71, operable coincidentally with the contact 14, closes the normally open gap between wires 72 and 73 leading to terminal points 7 and 8, respectively. From the terminal points, 7 and 8, wires 74 and 75 extend to similar wires on every car of a train to the head end where they are adapted to complete the circuit to a warning device (not shown) which may be of either the visible or audible type, or both, and which gives a continuous indication of any overheated bearing in the train, until the bearing affected has regained normal temperature.

Fig. 2 is a schematic illustration of the system with the various elements connected directly across the circuit from positive to negative in the simplest manner for ready tracing of the path of the current during the different phases of operation, and since like reference numerals have been applied to like parts in both Figures 1 and 2, no further description specifically with respect to Figure 2 is thought to be necessary.

From the foregoing it will be seen that there has been provided a hot bearing alarm system affording both visible and audible signals of an overheated bearing condition and in which the audible signal may be silenced with the assurance that the system cannot be left in an inoperative condition when the overheated bearing cools to normal temperature through any oversight on the part of the person accepting the alarm, since the system is automatically reset upon restoration of normal conditions and failure to restore the silenced alarm is thus obviated. Likewise, by having the normal circuit energized and arranged so that a break in the circuit effects the warning signal, any failure in the circuit will cause an alarm rather than prevent one. With this arrangement simple test means may be provided for testing in exactly the same manner as by an overheated bearing by merely opening a gap in the circuit by means of a switch for that purpose.

What is claimed is:

The combination with a bearing comprising an electrical circuit including a thermostat associated with the bearing, visible and audible alarms in said circuit and means including a relay whereby said alarms are energized by action of the thermostat in accordance with abnormal temperature conditions of said bearing, a normally de-energized relay and means whereby it may be energized to silence the audible alarm, a holding circuit for maintaining the energization of said last named relay, manual means in the holding circuit for breaking the holding circuit, and means whereby said first named relay is energized by action of said thermostat in accordance with normal temperature conditions of said bearing to deenergize said last named relay.

LEIGH J. STEPHENSON.